United States Patent
O'Neill

(10) Patent No.: US 10,373,007 B2
(45) Date of Patent: Aug. 6, 2019

(54) DOUBLE FEED EXCEPTIONS IDENTIFYING SYSTEM

(71) Applicant: NCR Corporation, Duluth, GA (US)

(72) Inventor: Darryl Scott O'Neill, Waterloo (CA)

(73) Assignee: NCR Corporation, Atlanta, GA (US)

( * ) Notice: Subject to any disclaimer, the term of this patent is extended or adjusted under 35 U.S.C. 154(b) by 205 days.

(21) Appl. No.: 15/472,996

(22) Filed: Mar. 29, 2017

(65) Prior Publication Data
US 2018/0285671 A1 Oct. 4, 2018

(51) Int. Cl.
| B65H 7/12 | (2006.01) |
| G06K 9/00 | (2006.01) |
| G06K 9/18 | (2006.01) |
| H04N 1/00 | (2006.01) |
| G03G 15/00 | (2006.01) |
| G07D 7/183 | (2016.01) |
| G07D 11/237 | (2019.01) |

(52) U.S. Cl.
CPC ............. G06K 9/186 (2013.01); B65H 7/125 (2013.01); G07D 7/183 (2017.05); G07D 11/237 (2019.01); H04N 1/00628 (2013.01); B65H 2511/512 (2013.01); B65H 2515/60 (2013.01); B65H 2515/71 (2013.01); B65H 2701/1912 (2013.01); G03G 15/703 (2013.01); G06K 9/00 (2013.01); G06K 2209/01 (2013.01)

(58) Field of Classification Search
CPC ............... G06K 9/186; G06K 9/00442; G06K 9/00456; G06K 9/00483; G06K 9/03; G06K 9/036; G06K 9/2063; G07D 7/183; G07D 11/237; G07F 19/20; G07F 19/00; G07F 19/202; B65H 7/12; B65H 7/125; B65H 2220/01–03; B65H 2511/524; H04N 1/00628; H04N 1/0057; H04N 1/00716; G06Q 20/042
See application file for complete search history.

(56) References Cited

U.S. PATENT DOCUMENTS

| 6,473,674 | B1 * | 10/2002 | Okada | B65H 7/125 |
| | | | | 700/227 |
| 6,986,464 | B2 | 1/2006 | Takiguchi et al. | |
| 7,341,178 | B2 | 3/2008 | Fujikawa | |
| 7,673,875 | B2 | 3/2010 | Motohashi et al. | |
| 7,689,025 | B2 | 3/2010 | Takiguchi | |
| 7,845,637 | B2 * | 12/2010 | Shimazaki | B65H 7/12 |
| | | | | 271/259 |
| 8,218,851 | B1 * | 7/2012 | Cantley | G06Q 20/042 |
| | | | | 382/137 |
| 8,351,678 | B1 * | 1/2013 | Medina, III | G06Q 40/00 |
| | | | | 235/379 |

(Continued)

OTHER PUBLICATIONS

EP Search Report.

*Primary Examiner* — Michael S Osinski
(74) *Attorney, Agent, or Firm* — Schwegman, Lundberg & Woessner

(57) ABSTRACT

Examples of a system and method for identifying double feed documents are generally described. A method may include scanning a plurality of documents using a scanner in a first configuration and rejecting identified potential double feeds of checks from the plurality of checks in the first configuration. The method may include rescanning identified potential double feeds in a second configuration.

14 Claims, 5 Drawing Sheets

(56) References Cited

U.S. PATENT DOCUMENTS

| | | | | |
|---|---|---|---|---|
| 8,468,074 B2* | 6/2013 | Schrick | | G06Q 40/00 |
| | | | | 705/35 |
| 8,625,877 B2 | 1/2014 | O'Neill et al. | | |
| 8,657,285 B2* | 2/2014 | Matsuoka | | B65H 5/06 |
| | | | | 271/262 |
| 8,761,487 B2* | 6/2014 | O'Neill | | G06K 9/186 |
| | | | | 382/139 |
| 9,292,737 B2* | 3/2016 | Nepomniachtchi | | |
| | | | | G06K 9/00442 |
| 9,384,418 B1* | 7/2016 | Cantley | | G06Q 20/042 |
| 9,560,228 B2* | 1/2017 | Aizono | | H04N 1/0057 |
| 2006/0219773 A1* | 10/2006 | Richardson | | G06K 9/033 |
| | | | | 235/379 |
| 2007/0007103 A1* | 1/2007 | Takai | | G07D 11/175 |
| | | | | 194/206 |
| 2007/0090591 A1* | 4/2007 | Roberts | | B65H 7/125 |
| | | | | 271/258.01 |
| 2008/0088084 A1* | 4/2008 | Shimazaki | | B65H 7/12 |
| | | | | 271/262 |
| 2008/0181639 A1* | 7/2008 | Yokomizo | | G03G 15/2064 |
| | | | | 399/68 |
| 2009/0252437 A1* | 10/2009 | Li | | G06K 9/3283 |
| | | | | 382/289 |
| 2011/0243394 A1* | 10/2011 | Matsuo | | G06Q 20/042 |
| | | | | 382/115 |
| 2013/0156291 A1* | 6/2013 | O'Neill | | G06K 9/186 |
| | | | | 382/140 |
| 2014/0112571 A1* | 4/2014 | Viera | | G06Q 40/12 |
| | | | | 382/138 |
| 2014/0355865 A1* | 12/2014 | Cantley | | G06Q 20/042 |
| | | | | 382/137 |
| 2015/0098642 A1* | 4/2015 | Jacomet | | G07D 11/30 |
| | | | | 382/135 |
| 2015/0120563 A1* | 4/2015 | Smith | | G06Q 20/10 |
| | | | | 705/45 |
| 2015/0239695 A1* | 8/2015 | Noda | | B65H 7/14 |
| | | | | 271/265.01 |
| 2016/0127571 A1* | 5/2016 | Kamisoyama | | G06K 9/00469 |
| | | | | 358/488 |
| 2016/0241731 A1* | 8/2016 | Koyanagi | | H04N 1/00822 |
| 2016/0289027 A1* | 10/2016 | Mizuno | | B65H 7/06 |
| 2017/0210582 A1* | 7/2017 | Okano | | B65H 3/06 |
| 2017/0310839 A1* | 10/2017 | Naito | | H04N 1/00718 |
| 2017/0374214 A1* | 12/2017 | Kanamitsu | | B65H 3/063 |

* cited by examiner

DOUBLE FEED EXCEPTIONS IDENTIFYING SYSTEM

BACKGROUND

A check processing system includes a transport to convey checks through the system and a scanner to image the checks. The check processing system includes a feeder that moves checks through the system to a first tray for processed checks and a second tray for rejected checks. Checks are rejected when they are processed as double feeds, meaning the system detects the possibility that more than one check is present. Some check processing systems use ultrasonic double feed detection by passing an ultrasonic wave through checks as they pass. Some checks are included in carrier envelopes, such as when a check is damaged. The check processing system using the ultrasonic double feed detection processes the carrier envelope as a double feed due to the multiple pieces of paper involved in using a carrier envelope.

In cases when the status is not automatically be determined, a user is prompted to override the exception or to reject the item. Overrides continue scanning, while rejected items cause a double feed detection exception requiring the item to be reprocessed. The check processing system is not always able to determine whether an item is hiding behind a carrier envelope or if the item in the track is a carrier envelope that failed automatic detection. With busy operators who may normally override, it is possible that they will make the wrong selection. The cost of a missed true double feed means delays and reprocessing. In some operations that are branch scan and go operations, the balancing happens in another location, there is significant time lost in finding the error and fixing it. High dollar items cause lost interest and float money due to delays.

SUMMARY

In various embodiments, methods and systems for evaluating double feeds in a check processing system are presented.

According to an embodiment, a method may include scanning a plurality of checks using a scanner in a first configuration and rejecting all identified potential double feeds of checks from the plurality of checks in the first configuration. The method may include rescanning the identified potential double feeds in a second configuration.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
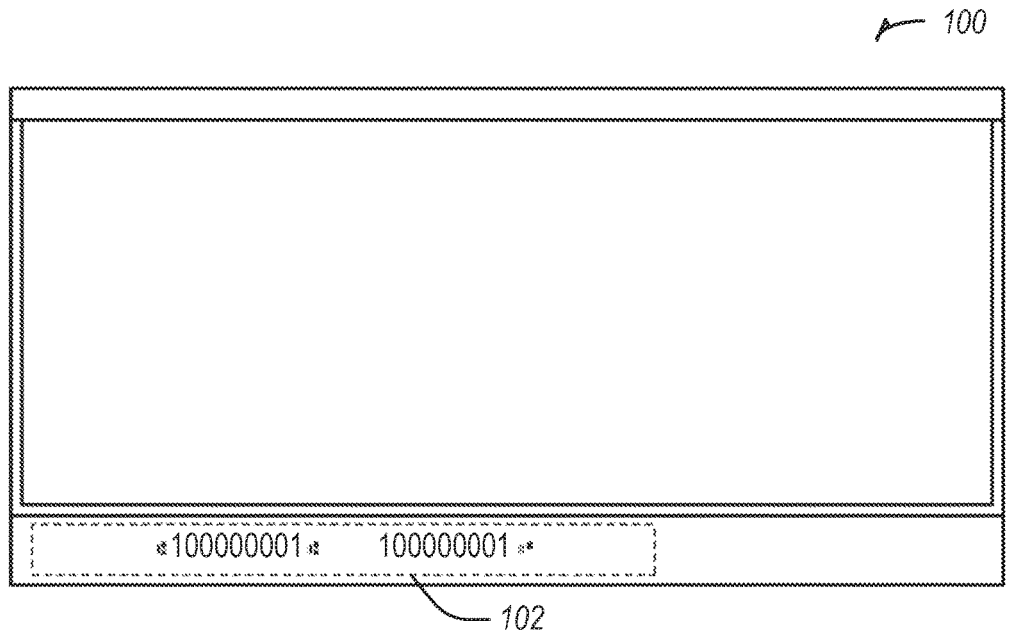
FIG. 1 illustrates generally a carrier envelope in accordance with some embodiments.

Systems and methods described herein are used to process potential double feeds in a check processing system. As described above, missed double feeds in a check processing system may cause significant delays and financial burdens on processors. Operator error may cause or contribute to missed double feeds including false positives (not an actual double feed that is treated as a double feed) and false negatives (an actual double feed that is allowed to proceed as if it is not a double feed).

Double feeds occur when two checks or a check and some other piece of paper stick together. The double feeds proceed through a feeder and an error is identified. Identifying the error may include using Magnetic Ink Character Recognition (MICR), Optical Character Recognition (OCR), ultrasonic detection, imaging, or the like. For example, double feed detection may include pattern matching, such as by using a pre-encoded MICR string to detect carrier items, to check for blank MICR, or using Optical Character Recognition (OCR) from an original item in the see-through window of the carrier envelope. Double feed detection allows for carrier envelopes in many cases to be automatically detected and allowed to pass while preventing double feeds from passing. However, these double feed detection techniques may not catch all double feeds. Therefore, all false double feeds and true double feeds may not be distinguishable using these techniques.

Some check processing systems use ultrasonic double feed detection by passing an ultrasonic wave through checks as they pass. For example, an ultrasonic emitter sends the ultrasonic wave through a check or a potential double feed as each respectively passes, and an ultrasonic receiver detects the ultrasonic wave. The ultrasonic receiver may be opposite the check or potential double feed from the ultrasonic emitter or may be on the same side and receive a reflected wave. The ultrasonic receiver may detect a strength of the ultrasonic wave and the strength may be compared to a known emitted strength. Using the comparison and known loss of ultrasonic energy when sent through paper (e.g., typical check paper width, carrier envelope width, etc.), a determination may be made as to whether a current item is a single item or a potential double feed.

To provide a system and technique to detect double feeds while permitting non-double feeds to pass, two operations are described below. First, a run is conducted where a system may automatically reject every suspected double feed. The first run may include carrier envelope identification (e.g., using MICR, OCR, an ultrasonic sensor, etc.) to allow identifiable carrier envelopes to pass and not be rejected (since they are not double feeds). The first run may send passed items to a first pocket and rejected items to a second pocket. Performing the first run while automatically rejecting all possible double feeds allows the system to avoid relying on human intervention (e.g., the system performs the rejections and passes automatically without a person interacting with the system). Eliminating human interaction improves speed of the system by not forcing the system to wait for human feedback (e.g., to reject or override) and improves quality (e.g., eliminates human error when rejecting or especially when overriding). Further, when an operator is presented with fewer choices, the operator is more likely to correctly determine whether a potential double feed is a true double feed (e.g., by not facing decision fatigue).

The rejected double feed items may then be rerun in a second run to determine whether the items are false double feeds or true double feeds. Before performing the second run, the potential double feeds may be evaluated (e.g., manually) to separate obvious double feeds. In an example, as a natural consequence of removing the potential double feeds from the second pocket and placing them in a feeder to be rerun a potential double feed may separate, alleviating the problem for that potential double feed.

When the potential double feeds are rerun, two additional problems may arise. In an example, when a potential double feed is a carrier envelope that was not automatically overridden, for example because of a misread MICR or a poor OCR read, the carrier envelope may again fail during the second run, and will thus be rejected as a double feed, even though it is not. If the potential double feed is a true double feed the two items may stick together the second time as well or true double feeds may separate when run the second time. The second problem occurs when a double feed occurs on the second run.

There are a few ways to solve these additional problems when potential double feeds arise during the second run. In an example, an option may be provided for a potential double feed to be ignored during the second run. For example, the second run may include individually running potential double feeds one at a time and ignoring any double feed error. This technique may be used, for example in cases where an operator is trained to only run a single item after a double feed exception. As long as the potential double feed is inspected by the operator to ensure that the potential double feed is not a true double feed (or separate a true double feed into its component non-true double feed parts), this procedure ensures that no true double feeds are passed through and that no potential double feeds remain.

In an example, a comparison may be made between previous data regarding a potential double feed and information obtained from the second run. For example, a comparison between MICR or OCR information from the potential double feed may be compared with MICR or OCR information of the rescanned potential double feed. Comparing these MICR or OCR information from the first run to the second run may be used to determine whether the same features were present in the first run and the second run. For example, if a potential double feed is a true double feed in the first run and then separates before the second run, the MICR or OCR information may change. If the potential double feed is not a true double feed (e.g., is a carrier envelope), then the MICR or OCR information may not change or may be similar from the first run to the second run.

The MICR or OCR information may be compared from the first run to the second run using a distance function, such as a Levenshtein distance where a number of changes between the first run information and the second run information may be determined. For example, in a true double feed, MICR lines may overlap and change the MICR line to have invalid patterns or a high number of reject characters. If the true double feed is separated, then an OCR of one of the items of the true double feed may be the same (e.g., in a front-view OCR) and the MICR may be different. This may indicate the true double feed has been corrected. The MICR may include a good pattern and not create a double feed error.

In an example, when a true double feed is run on the second run (and remains a true double feed), the items of the true double feed are likely to shift relative to each other. This shifting may produce the same OCR in the first and second runs and a different "bad" (e.g., unreadable or partially unreadable) MICR in the first and second runs. Conversely, a potential double feed that is not a true double feed may have a readable MICR (which may be the same) and the same OCR between runs.

In another example, a potential double feed with the same bad MICR in both runs (e.g., with a similar or same OCR) may be overridden as an item with a bad MICR (e.g., a different type of error for the item, which may be handled separately or individually). In yet another example, the potential double feed with the same bad MICR in both runs may be rejected, forcing a third run through the feeder. Then, if the item has the same results in the third run, then the error may be overridden or the operator may be prompted to override the potential double feed.

FIG. 1 illustrates generally a carrier envelope 100 in accordance with some embodiments. The carrier envelope 100 includes an envelope that holds a check. A portion of the check including MICR readable numbers is viewable through a window 102 of the carrier envelope 100. Because the carrier envelope 100 when run through a check processing system includes at least three layers of paper (e.g., a front of the carrier envelope 100, a back of the carrier envelope 100, and the check), the carrier envelope 100 may cause the check processing system to falsely determine that the carrier envelope 100 is a potential double feed.

In an example, the carrier envelope 100 may have a second check or other piece of paper adhering to the front or the back of the carrier envelope 100, which may cause the check processing system to detect a potential double feed. In the case where the other paper adheres to the back of the carrier envelope 100, the MICR of the check within the carrier envelope 100 may be readable through the window 102. Then, after a second run, the MICR of the second run may match the MICR of the first run, but an OCR for the first run may not match an OCR for the second run. The OCRs may not match either because the paper has separated from the carrier envelope 100 (eliminating the double feed), or because the paper has shifted relative to the carrier envelope 100 (maintaining a double feed). In the first case with the eliminated double feed, the carrier envelope 100 may include a marking on the back side to indicate it is a carrier envelope. In another example, an OCR of the other piece of paper may be close in distance (e.g., using a distance function) to the original first run OCR of the double feed including the carrier envelope 100. The check processing system may determine from the two new OCR images, which may be taken of the front and back of a check in the feeder, that the double feed has separated. In the second case with the maintained double feed, the double feed may be again rejected to be inspected or rerun a third time.

In an example, all carrier documents may trigger a double feed when an ultrasonic sensor is used to detect double feeds, since all carrier documents include at least two or three sheets of paper. To distinguish carrier envelopes from double feeds (or from carrier envelopes also with a double feed), a system may check for a blank MICR for non-encoded carrier envelopes and a readable OCR (e.g., that is repeated for two runs, or close in distance between the two runs) of the check in the carrier window 102 (which represents a carrier envelope without a double feed). In another example, the system may check for a known MICR matching a pre-encoded pattern assigned to the carrier envelope 100 itself (e.g., some carrier envelopes may include a MCIR line on the carrier envelope 100 to identify the carrier envelope 100), which would also represent a carrier envelope without a double feed.

To identify a carrier envelope with a double feed, one or more of the following conditions may be present. An item attached to the back of a blank carrier envelope includes a readable OCR in the carrier window and a readable MICR read through the carrier. The item attached to the back with a pre-encoded carrier may include a readable OCR and have an issue reading any MICR due to overlap of the MICR characters. An item may be attached to the front of a pre-encoded carrier envelope may appear to have two overlapped checks and may be treated as that case, described below.

In the case where the other paper adheres to the front of the carrier envelope 100, the MICR numbers may not be detected through the window 102, may be read incorrectly, or may be read but may not match the OCR of the front of the carrier envelope 100 because the other paper is in the OCR rather than the front of the carrier envelope 100. The MICR numbers may be read despite being covered by paper, since the MICR numbers are read magnetically rather than optically. The OCR requires optical imaging and may be obscured if covered by paper, and thus the MICR reading and the OCR reading may not match, indicating a double feed. Then, after a second run, the MICR of the second run may match the MICR of the first run, but an OCR for the first run may not match an OCR for the second run (but may match the MICR reading). The OCRs may not match either because the paper has separated from the carrier envelope 100 (eliminating the double feed), or because the paper has shifted relative to the carrier envelope 100 (maintaining a double feed). These cases may be handled similarly to those described above for when the paper was attached to the back of the carrier envelope 100.

Figure 2:
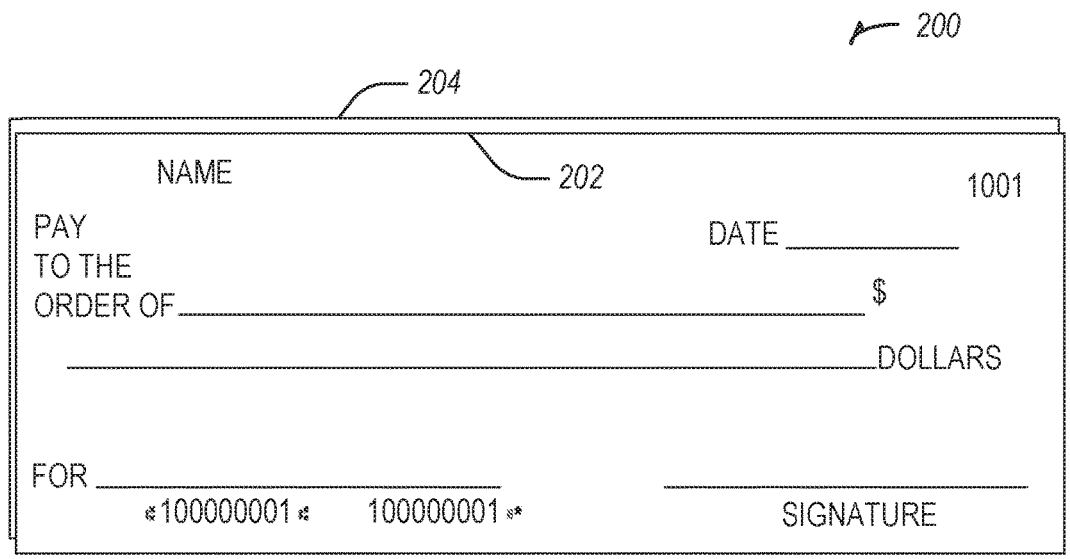
FIG. 2 illustrates generally a double feed in accordance with some embodiments.

FIG. 2 illustrates generally a double feed 200 in accordance with some embodiments. The double feed 200 includes a check 202 and a piece of paper 204. The check 202 and the piece of paper 204 may be affixed to each other, such as with an adhesive, mechanical coupling (e.g., bent paper), static, etc. The double feed 200 is not limited to two items, but may include three or more items. In an example, the piece of paper 204 may include a check (e.g., a second check). In another example, the double feed 200 may be present with the piece of paper 204 replaced by a piece of plastic or a piece of other thin material.

In an example, the piece of paper 204 is a second check. The check 202 and the second check may each include MICR numbers, which may appear scrambled or unreadable when a check processing system attempts to read them, especially if they line up or are generally located in a similar position (e.g., both checks facing the same direction, though there may be some skew or tilt). When separated, the check 202 and the second check may have readable MICR numbers, which may be used to indicate that the double feed 200 is no longer present. If the double feed 200 persists because the checks continue to adhere to each other, the MICR may appear in a second run as the same scrambled or unreadable MICR from a first run. An OCR of the double feed 200 may be similar between the first run and the second run (e.g., using a distance function, such as a Levenshtein distance). These two similarities may result in a determination in the second run that the double feed 200 is a true double feed and is to be manually inspected.

When the piece of paper 204 is not a check (e.g., is instead a blank sheet of paper, an empty carrier envelope, etc.), the MICR numbers of the check 202 may be readable in a first run. An ultrasonic test may be used to determine that the double feed 200 is a potential double feed. When the double feed 200 is separated into the check 202 and the piece of paper 204, the MICR numbers for the check 202 are again readable in a second run, but the OCR for the check 202 may change, indicating that the double feed 200 may be fixed. The ultrasonic test may be performed during the second run as well, which may further indicate that the double feed 200 has been fixed. The piece of paper 204 may be discarded, when it is not necessary to process.

Figure 3:
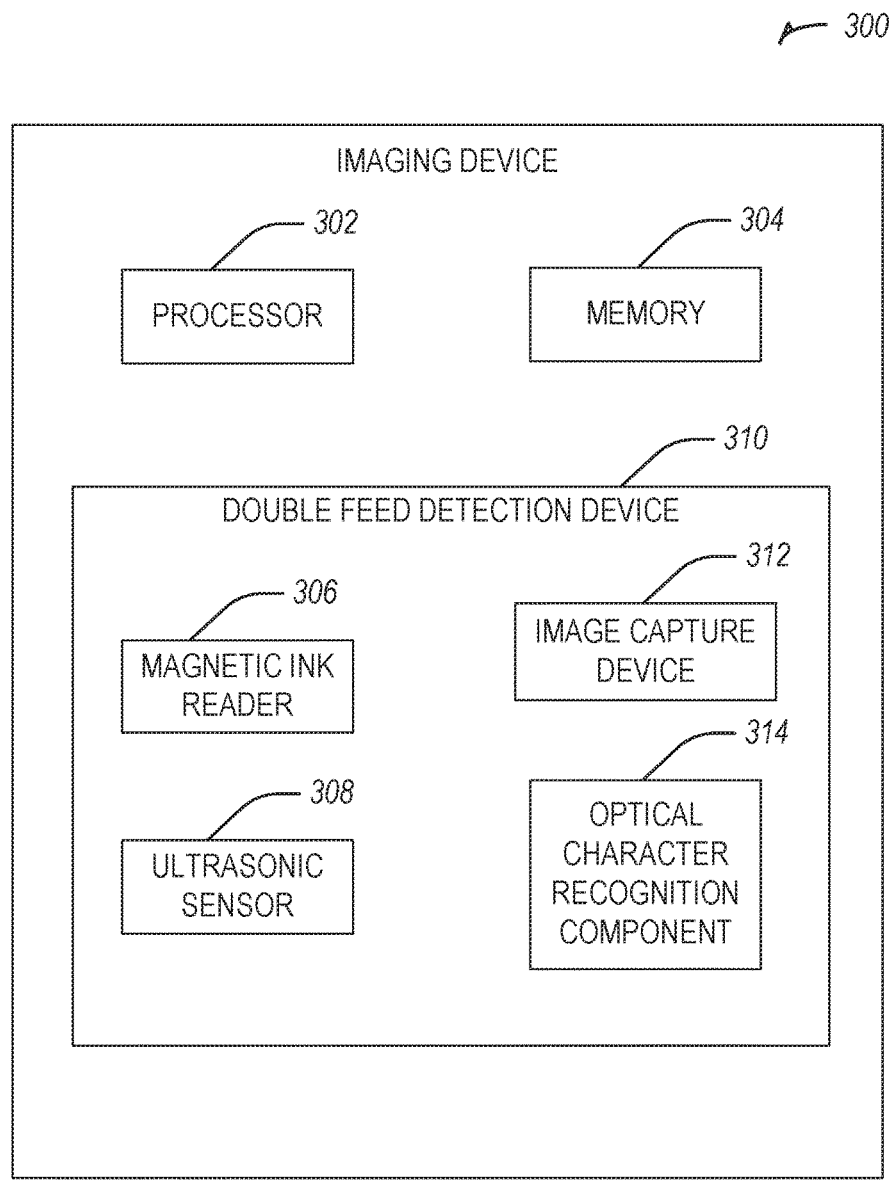
FIG. 3 illustrates generally an imaging device system in accordance with some embodiments.

FIG. 3 illustrates generally an image processing system 300 in accordance with some embodiments. The image processing system 300 includes a processor 302, memory 304, and a double feed detection device 310. The double feed detection device 310 may include a magnetic ink reader 306 (e.g., to perform MICR), an ultrasonic sensor 308 (e.g., including an ultrasonic emitter or an ultrasonic receiver), an image capture device 312 (e.g., a camera or a scanner to capture an image of an item), or an optical character recognition component 314 (e.g., to perform OCR on the image captured by the image capture device 312).

The double feed detection device 310 may be used to perform scans of one or more checks or other items. For example, the double feed detection device 310 may perform a first scan of a plurality of checks. The first scan may include imaging the plurality of checks using the image capture device 312, performing a MICR on checks of the plurality of checks using the magnetic ink reader 306, or emitting and receiving an ultrasonic wave passing through checks of the plurality of checks using the ultrasonic sensor 308. The optical character recognition component 314 may be used to perform OCR on images produced by the image capture device 312.

The processor 302 may identify the potential double feed in the first scan, such as by using data obtained from the ultrasonic sensor 308. The processor 302 may determine whether the potential double feed is a carrier document. For example, the processor 302 may use information from the MICR performed by the magnetic ink reader 306 to determine whether valid numbers were detected (e.g., were not scrambled or unreadable). In an example, the processor 302 may use the OCR performed by the optical character recognition component 314 to determine whether the potential double feed is a carrier document. When the processor 302 determines that the potential double feed is a carrier document and is not a double feed (e.g., does not also include a potential double feed issue), the carrier document may be permitted to proceed by the processor 302. When the processor 302 determines that the determination is inconclusive or that the potential double feed is not a carrier document, the processor 302 may reject the potential double feed. After rejection, the second scan may be performed by the double feed detection device 310.

After the second scan is completed (e.g., for the potential double feed), the processor 302 may compare attributes of the first scan to attributes of the second scan to determine whether the potential double feed is a true double feed. The determination may include comparing a first set of optical or magnetic recognition attributes (e.g., from the optical character recognition component 314 or the magnetic ink reader 306) from the first scan of the potential double feed to a second set of optical or magnetic recognition attributes from the second scan of the potential double feed.

The processor 302 may determine whether a change in a magnetic recognition attribute or a change in an optical recognition attribute from the first scan to the second scan (e.g., in the potential double feed) has occurred. In an example, in response to determining that a change has occurred in the magnetic recognition attribute without a change in the optical recognition attribute, the processor 302 determines that the potential double feed is a true double feed.

In an example, using a distance function to determine a distance between a first and a second OCR or MICR may include using an edit distance function, such as a Levenshtein distance, which allows for deletion, insertion, and substitution, a longest common subsequence (LCS) distance, which allows for insertion and deletion, but not substitution, a Hamming distance, which allows for substitution, a Damerau-Levenshtein distance, which allows for insertion, deletion, substitution, and the transposition of two adjacent characters, a Jaro distance, which allows for transposition, or the like.

Figure 4:
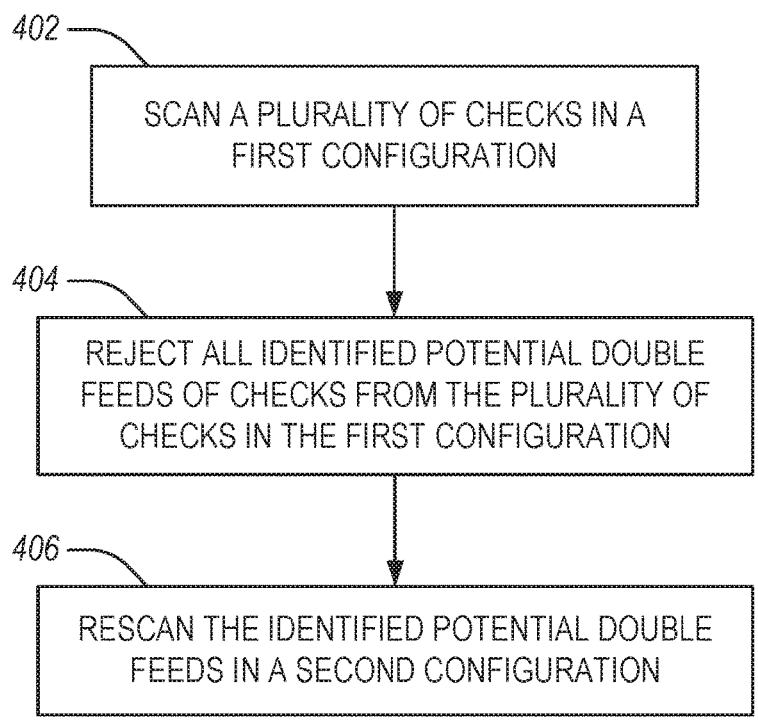
FIG. 4 illustrates generally a flowchart showing a technique for processing potential double feeds in accordance with some embodiments.

FIG. 4 illustrates generally a flowchart showing a technique 400 for processing potential double feeds in accordance with some embodiments. The technique 400 includes an operation 402 to scan a plurality of checks in a first configuration. The technique 400 includes an operation 404 to reject all identified potential double feeds of checks from the plurality of checks in the first configuration. The technique 400 includes an operation 406 to rescan the identified potential double feeds in a second configuration.

The technique 400 may include an operation to accept all identified potential double feeds in the second configuration. The technique 400 may include comparing a first set of optical or magnetic recognition attributes from a first scan of a document in the first configuration to a second set of optical or magnetic recognition attributes from a second scan of the document in the second configuration. The technique 400 may include determining a change in a magnetic recognition attribute from the first scan to the second scan, determining no change in an optical recognition attribute from the first scan to the second scan, and in response, determining that the document is a double feed. The technique 400 may include determining no change in a magnetic recognition attribute from the first scan to the second scan, determining no change in an optical recognition attribute from the first scan to the second scan, and in response, determining that the document is not a double feed. In an example, comparing the first and second sets may include using a threshold Levenshtein distance.

Figure 5:
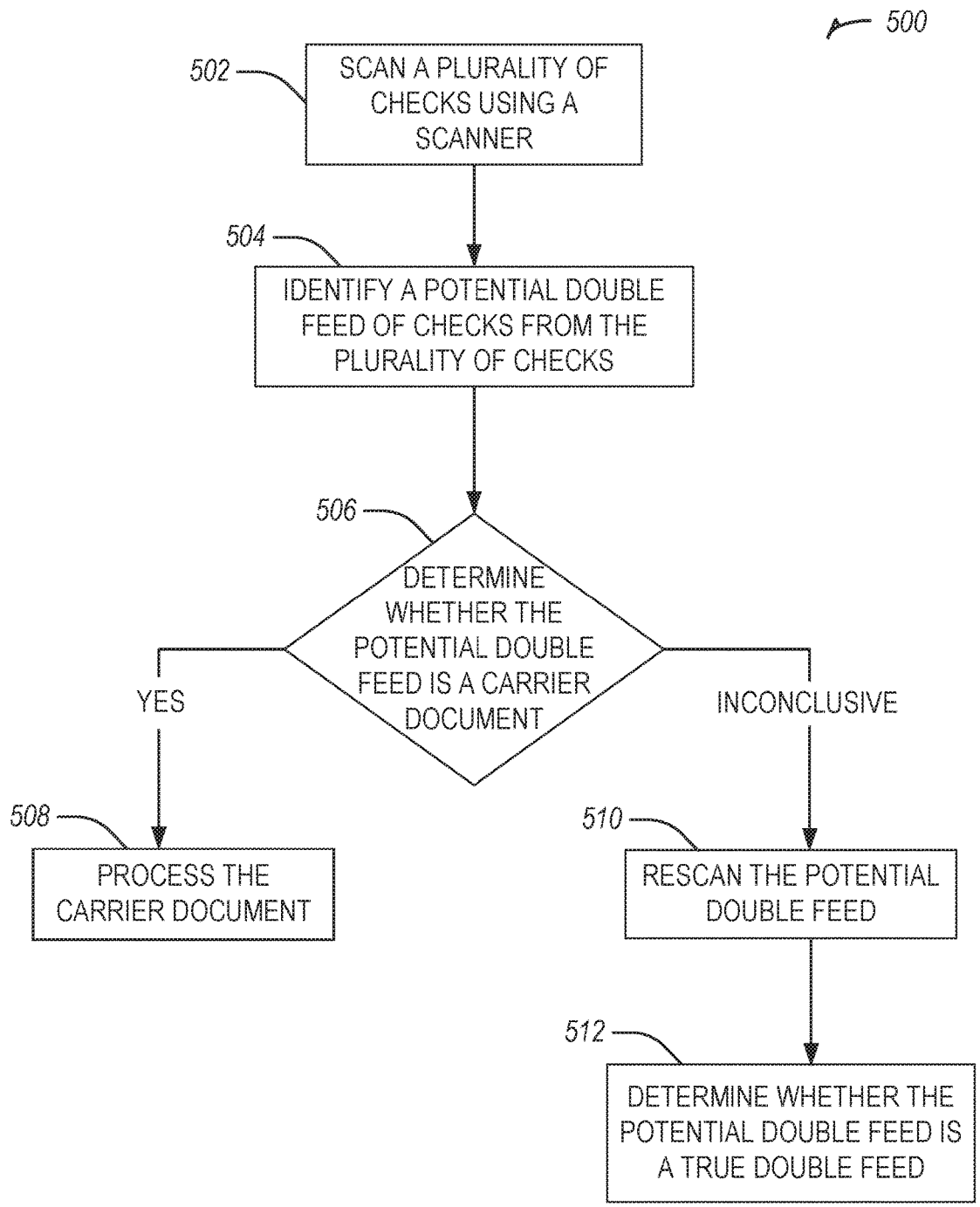
FIG. 5 illustrates generally a flowchart showing a technique for determining whether potential double feeds are true double feeds in accordance with some embodiments.

FIG. 5 illustrates generally a flowchart showing a technique 500 for determining whether potential double feeds are true double feeds in accordance with some embodiments. The technique 500 includes an operation 502 to scan a plurality of checks using a scanner. The technique 500 includes an operation 504 to identify a potential double feed of checks from the plurality of checks.

The technique 500 includes an decision operation 506 to determine whether the potential double feed is a carrier document. The technique 500 includes an operation 508 to process the carrier document, for example in response to determining that the potential double feed is a carrier document. Operation 508 may include, in response to determining the potential double feed is not a true double feed, processing the potential double feed. The technique 500 includes an operation 510 to rescan the potential double feed, for example in response to the determination being inconclusive.

The technique 500 includes an operation 512 to determine whether the potential double feed is a true double feed. In response to operation 512, the technique 500 may include rejecting the true double feed (e.g., sending the true double feed to a rejection tray). Operation 512 may include comparing attributes of a first scan of the potential double feed to attributes of a second scan of the potential double feed to determine whether the potential double feed is a true double feed.

Comparing attributes may include using magnetic recognition, the attributes of the first and second scan including characters scanned from magnetic ink. The technique 500 may include determining that the potential double feed is a true double feed when a plurality of characters from the first scan differ from a plurality of characters from the second scan. In an example, comparing attributes may include determining the second scan corresponds with the first scan by comparing a code line for the second scan to a code line for the first scan.

In an example, comparing attributes may include using optical recognition. The technique 500 may include an operation to determine that the potential double feed is a true double feed when a comparison of an optical recognition of the first scan differs from an optical recognition of the second scan by at least a threshold. The threshold may include a Levenshtein distance threshold. In an example, comparing attributes may include determining the second scan corresponds with the first scan by comparing an image size for the second scan to an image size for the first scan. In an example, comparing attributes may include using an ultrasonic sensor.

Figure 6:
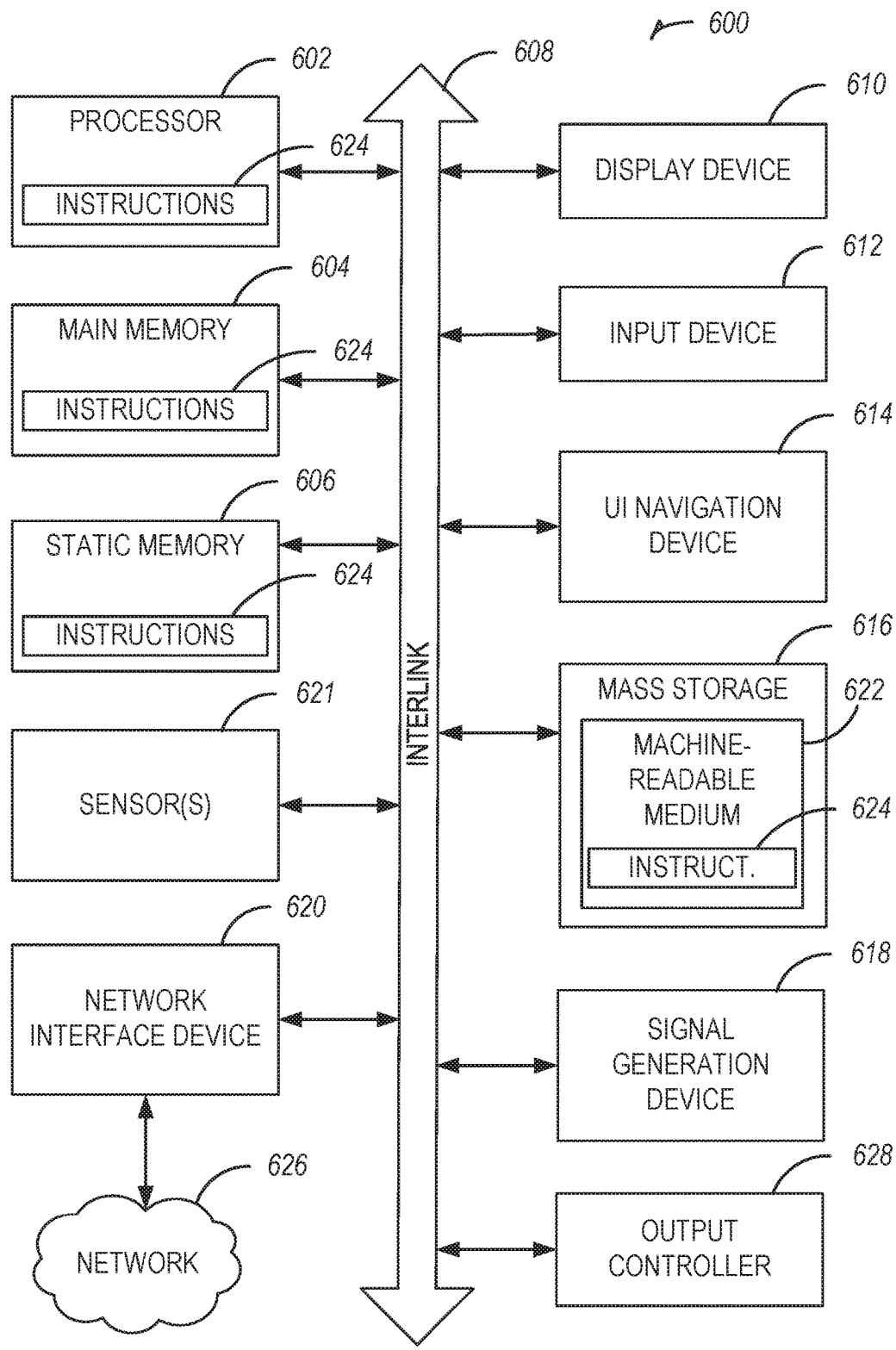
FIG. 6 illustrates generally an example of a block diagram of a machine upon which any one or more of the techniques discussed herein may perform in accordance with some embodiments.

FIG. 6 illustrates generally an example of a block diagram of a machine 600 upon which any one or more of the techniques discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 is a method comprising: scanning a plurality of checks using a scanner; identifying a potential double feed of checks from the plurality of checks; determining whether the potential double feed is a carrier document; in response to the determination being inconclusive, rejecting the potential double feed; rescanning the potential double feed; and comparing attributes of a first scan of the potential double feed to attributes of a second scan of the potential double feed to determine whether the potential double feed is a true double feed.

In Example 2, the subject matter of Example 1 optionally includes wherein, in response to determining the potential double feed is a true double feed, rejecting the true double feed.

In Example 3, the subject matter of any one or more of Examples 1-2 optionally include wherein, in response to determining the potential double feed is not a true double feed, processing the potential double feed.

In Example 4, the subject matter of any one or more of Examples 1-3 optionally include wherein comparing attributes of the first scan of the potential double feed to attributes of the second scan of the potential double feed includes using magnetic recognition, the attributes of the first and second scan including characters scanned from magnetic ink.

In Example 5, the subject matter of Example 4 optionally includes determining that the potential double feed is a true double feed when a plurality of characters from the first scan differ from a plurality of characters from the second scan.

In Example 6, the subject matter of any one or more of Examples 1-5 optionally include wherein comparing attributes of the first scan of the potential double feed to attributes of the second scan of the potential double feed includes using optical recognition.

In Example 7, the subject matter of Example 6 optionally includes determining that the potential double feed is a true double feed when a comparison of an optical recognition of the first scan differs from an optical recognition of the second scan by at least a threshold.

In Example 8, the subject matter of Example 7 optionally includes wherein the threshold is a Levenshtein distance.

In Example 9, the subject matter of any one or more of Examples 1-8 optionally include wherein comparing attributes of the first scan of the potential double feed to attributes of the second scan of the potential double feed includes determining the second scan corresponds with the first scan by comparing an image size for the second scan to an image size for the first scan.

In Example 10, the subject matter of any one or more of Examples 1-9 optionally include wherein comparing attributes of the first scan of the potential double feed to attributes of the second scan of the potential double feed includes determining the second scan corresponds with the first scan by comparing a code line for the second scan to a code line for the first scan.

In Example 11, the subject matter of any one or more of Examples 1-10 optionally include wherein comparing attributes of the first scan of the potential double feed to attributes of the second scan of the potential double feed includes using an ultrasonic sensor.

Example 12 is a method comprising: scanning a plurality of checks using a scanner in a first configuration; rejecting all identified potential double feeds of checks from the plurality of checks in the first configuration; and rescanning the identified potential double feeds in a second configuration.

In Example 13, the subject matter of Example 12 optionally includes accepting all identified potential double feeds in the second configuration.

In Example 14, the subject matter of Example 13 optionally includes comparing a first set of optical or magnetic recognition attributes from a first scan of a document in the first configuration to a second set of optical or magnetic recognition attributes from a second scan of the document in the second configuration.

In Example 15, the subject matter of Example 14 optionally includes determining a change in a magnetic recognition attribute from the first scan to the second scan, determining no change in an optical recognition attribute from the first scan to the second scan, and in response, determining that the document is a double feed.

In Example 16, the subject matter of any one or more of Examples 14-15 optionally include determining no change in a magnetic recognition attribute from the first scan to the second scan, determining no change in an optical recognition attribute from the first scan to the second scan, and in response, determining that the document is not a double feed.

In Example 17, the subject matter of any one or more of Examples 14-16 optionally include wherein comparing the first and second sets includes using an edit distance function, including at least one of a Levenshtein distance, a longest common subsequence (LCS) distance, a Hamming distance, a Damerau-Levenshtein distance, or a Jaro distance.

Example 18 is a system comprising: a scanner to: perform a first scan of a plurality of checks; and perform a second scan of a potential double feed of checks from the plurality of checks; and a processor to: identify the potential double feed in the first scan; determine whether the potential double feed is a carrier document; in response to the determination being inconclusive, rejecting the potential double feed; and compare attributes of the first scan to attributes of the second scan to determine whether the potential double feed is a true double feed.

In Example 19, the subject matter of Example 18 optionally includes wherein the processor is further to compare a first set of optical or magnetic recognition attributes from a first scan of a document in the first configuration to a second set of optical or magnetic recognition attributes from a second scan of the document in the second configuration.

In Example 20, the subject matter of any one or more of Examples 18-19 optionally include wherein the processor is further to: determine a change in a magnetic recognition attribute from the first scan to the second scan; determine no change in an optical recognition attribute from the first scan to the second scan; and in response, determine that the document is a double feed.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
performing a first scan of a plurality of checks using a scanner;
identifying a potential double feed of checks from the plurality of checks based on the first scan;
determining whether the identified potential double feed is a carrier document;
in response to the determination being inconclusive, rejecting the identified potential double feed;
performing a second scan of the identified potential double feed using the scanner; and
comparing attributes of the first scan of the identified potential double feed to attributes of the second scan of the identified potential double feed to determine whether the identified potential double feed is a true double feed.

2. The method of claim 1, wherein, in response to determining the identified potential double feed is a true double feed, rejecting the true double feed.

3. The method of claim 1, wherein, in response to determining the identified potential double feed is not a true double feed, processing the potential double feed.

4. The method of claim 1, wherein comparing attributes of the first scan of the identified potential double feed to attributes of the second scan of the identified potential double feed includes using magnetic recognition, the attributes of the first and second scan including characters scanned from magnetic ink.

5. The method of claim 4, further comprising determining that the identified potential double feed is a true double feed when a plurality of characters from the first scan differ from a plurality of characters from the second scan.

6. The method of claim 1, wherein comparing attributes of the first scan of the identified potential double feed to attributes of the second scan of the identified potential double feed includes using optical recognition.

7. The method of claim 6, further comprising determining that the identified potential double feed is a true double feed when a comparison of an optical recognition of the first scan differs from an optical recognition of the second scan by at least a threshold.

8. The method of claim 7, wherein the threshold is a Levenshtein distance.

9. The method of claim 1, wherein comparing attributes of the first scan of the identified potential double feed to attributes of the second scan of the identified potential double feed includes determining the second scan corresponds with the first scan by comparing an image size for the second scan to an image size for the first scan.

10. The method of claim 1, wherein comparing attributes of the first scan of the identified potential double feed to attributes of the second scan of the identified potential double feed includes determining the second scan corresponds with the first scan by comparing a code line for the second scan to a code line for the first scan.

11. The method of claim 1, wherein comparing attributes of the first scan of the identified potential double feed to attributes of the second scan of the identified potential double feed includes using an ultrasonic sensor.

12. A check processing system comprising:
   a double feed detection device to:
      perform a first scan of a plurality of checks; and
      perform a second scan of a potential double feed of checks from the plurality of checks; and
   a processor to:
      identify the potential double feed based on the first scan;
      determine whether the identified potential double feed is a carrier document;
      in response to the determination being inconclusive, rejecting the identified potential double feed; and
      compare attributes of the first scan to attributes of the second scan to determine whether the identified potential double feed is a true double feed.

13. The system of claim 12, wherein the processor is further to compare a first set of optical or magnetic recognition attributes from the first scan of the identified potential double feed to a second set of optical or magnetic recognition attributes from the second scan of the identified potential double feed.

14. The system of claim 12, wherein the processor is further to:
   determine a change in a magnetic recognition attribute from the first scan to the second scan;
   determine no change in an optical recognition attribute from the first scan to the second scan; and
   in response, determine that the identified potential double feed is a true double feed.

* * * * *